J. D. MEADOR.
Bee Hive Appliance.

No. 81,808.  
Patented Sept. 1, 1868.

United States Patent Office.

JAMES D. MEADOR, OF INDEPENDENCE, MISSOURI.

Letters Patent No. 81,808, dated September 1, 1868.

IMPROVEMENT IN MOTH-FLY TRAP FOR BEE-HIVES.

*The Schedule referred to in these Letters Patent and making part of the same.*

TO ALL WHOM IT MAY CONCERN:

Be it known that I, JAMES D. MEADOR, of Independence, in the county of Jackson, and State of Missouri, have made certain new and useful Improvements in Moth-Fly Trap for Bee-Hives; and I do hereby declare that the following is a full and clear description thereof, reference being had to the accompanying drawings, and to the letters of reference marked thereon.

This invention relates to an improved form of trap, especially designed to catch the moth-fly, and prevent it from entering the hive where bees are kept, and thereby destroying the bees by imprisoning them in its chrysalis.

The invention consists in making, at each entrance to the hive, a trap, consisting of a metallic floor, which is cut into slits, forming tongues, the said tongues being bent down at an angle of, say, thirty degrees, more or less, below the horizon, thus forming a kind of serrated bottom, with openings between the forward or depressed ends of the lips and the general plane of the metallic floor. Below this metallic floor is a compartment, having a glass or other illuminating-bottom. The traps are to be so placed that every bee or insect seeking entrance to the hive will have to pass over the metallic floor, and, as the bee never descends, it will pass over the serrated openings of the floor, and on into the hive, while the moth-fly or other insects will pass down through the apertures of the metallic floor, and into the sub-apartment, where it will be securely entrapped and imprisoned. The depressed ends of the tongues and the lighted cell below combine to lure the insects into the trap.

To enable those skilled in the art to make and use my improved trap, I will proceed to describe its construction and operation.

Figure 1:
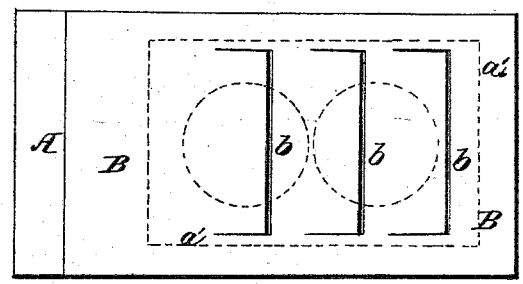

Figure 1 of the drawings is a plan of the improved trap, taken on top of the metallic floor.

Figure 2:
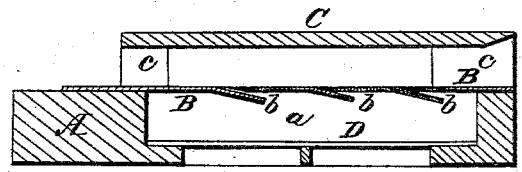

Figure 2 is a central sectional elevation of the same.

A is a box or block of wood, having a cavity or recess, $a$, represented in plan by the dotted line $a'$ in fig. 1.

This cavity or recess is floored over with the floor B, which has lips or tongues $b$ cut loose from the other portions of the floor on three of their sides, and bent down at an angle of, say, thirty degrees, more or less, as shown in fig. 2.

The cap C is to be placed over this floor, as shown in fig. 2, so as to leave a passage, $c$, open at both ends, over the floor B.

The bottom of the cell or recess $a$ is to be floored with a glass, D, or some other illuminating kind of flooring.

The trap, constructed as above described, is to be placed at the entrance to the bee-hive, which is to have no entrance besides this, unless similarly protected. The bees will pass over the floor B, and into the hive, through the passage $c$, but the moth-fly will descend on the inclined tongues $b$, and pass down into the cell $a$, where it will be firmly imprisoned until removed by the keeper. The illuminating-floor D serves to entice the fly in that direction as its way of escape.

Having described my invention, what I claim, is—

The tongued floor B, in combination with an illuminating-floor D, all arranged and employed as herein described and set forth.

I also claim the several parts A $a$, B $b$, D, and the covered way $c$, when constructed and combined as herein shown and described.

JAS. D. MEADOR.

Witnesses:
H. S. MEADOR.
L. S. MEADOR.